Patented Apr. 14, 1925.

1,533,569

UNITED STATES PATENT OFFICE.

ADOLFO POUCHAIN, OF TURIN, ITALY.

ELECTRIC ACCUMULATOR.

No Drawing.   Application filed September 25, 1922.   Serial No. 590,524.

*To all whom it may concern:*

Be it known that I, ADOLFO POUCHAIN, subject of the King of Italy, residing at Turin, Italy, have invented certain new and useful Improvements in Electric Accumulators, of which the following is a specification.

The present invention relates to electric accumulators comprising negative plates consisting wholly or partly of zinc as active material, and particularly to an electrolyte for use in electric accumulators of the said class, said electrolyte consisting of a sulphuric solution of zinc sulphate with other sulphates and with or without an addition of an organic substance.

The object of the present invention is a method for the preparation of an electrolyte of the class above referred to, said method consisting in submitting to a passage of electric current the electrolyte before its use in the accumulator.

According to this invention, crystallized zinc sulphate is firstly dissolved in sulphuric acid having the concentration usual in the accumulators (specific gravity of about 1, 2) and then other sulphates as aluminium sulphate, potassium or sodium sulphate and mercuric sulphate are added; then the liquid with or without a little addition of glycerine or of a high boiling point hydrocarbon, is submitted to an electric treatment consisting in causing an electric current to flow through it by introducing in the bath two metallic electrodes each connected with a pole of a source of either direct or alternating current.

This treatment is preferably made in presence of metallic mercury say with an amount of metallic mercury added to the liquid and lying on the bottom of the vessel.

When direct current is used, the positive terminal of the current source is connected with a plate of amalgamated zinc and the negative one is connected with a plate of any metal both said plates being immersed in the liquid.

When alternating current is used, both the plates immersed in the liquid must be of amalgamated zinc.

A current density of about 5–6 ampere per square decimeter may be used.

The use of alternating current shows the advantage over the use of direct current, that the plates are not caused to dissolve in the bath, as it occurs in respect of the positive plate when direct current is used; therefore the cost of the treatment is reduced and the composition of the treated liquid is not affected by the zinc dissolved during said treatment or by the impurities contained in the zinc constituting the positive plate and which become free because of the dissolution of zinc.

The passage of current is continued until the liquid, which is strongly turbid at the beginning of the operation, takes up an opalescent aspect and a slightly blue-brown colour.

After the described treatment the liquid is subjected to a filtering operation for removing the froths and impurities and then it is fully clear and colourless and ready for use in an electric accumulator.

By using in a lead-zinc accumulator an electrolyte prepared according to this method, the peculiar function of an electrolyte containing aluminium sulphate, sulphates of alkaline metals and mercuric sulphate, if desired with addition of organic substances, is always constant during the operation of the accumulator, and the advantages of an even deposition of the zinc during the charge, of a high adherence of the zinc layer, and of the zinc deposit being unattackable by electrolyte when the circuit is open, are attained since the beginning of the operation of the accumulator, at its first use.

What I claim as my invention and desire to secure by United States Letters Patent is:—

1. A method for preparing an electrolyte for electric accumulators comprising zinc as active material, comprising dissolving zinc sulphate, aluminium sulphate, sulphates of alkaline metals and mercuric sulphate in sulphuric acid, and then submitting this solution to a passage of electric current.

2. A method for preparing an electrolyte for electric accumulators comprising zinc as active material, comprising dissolving zinc sulphate aluminum sulphate, sulphates of alkaline metals and murcuric sulphate in sulphuric acid, adding glycerine and submitting the mixture to a passage of electric current.

3. A method for preparing an electrolyte for electric accumulators comprising zinc as active material, comprising dissolving zinc sulphate aluminum sulphate, sulphates of alkaline metals and murcuric sulphate in sulphuric acid, and then submitting this solution to a passage of electric current in the presence of metallic mercury.

4. A method for preparing an electrolyte for electric accumulators comprising zinc as active material, comprising dissolving zinc sulphate aluminum sulphate, sulphates of alkaline metals and murcuric sulphate in sulphuric acid, adding glycerine and submitting this mixture to a passage of electric current in the presence of metallic mercury.

In testimony whereof I have signed my name to this specification.

ADOLFO POUCHAIN.